United States Patent [19]
Weiler et al.

[11] Patent Number: 5,284,228
[45] Date of Patent: Feb. 8, 1994

[54] FLOATING-CALIPER SPOT-TYPE DISC BRAKE WITH ACTIVELY RESTORED BRAKE SHOES

[75] Inventors: Rolf Weiler, Eppstein; Uwe Hendrich, Mainz, both of Fed. Rep. of Germany

[73] Assignee: Alfred Teves GmbH, Frankfurt am Main, Fed. Rep. of Germany

[21] Appl. No.: 862,138

[22] Filed: Apr. 2, 1992

[51] Int. Cl.⁵ .................. F16D 65/02; F16D 65/52
[52] U.S. Cl. ........................ 188/71.8; 188/72.3; 188/73.38; 188/196 P; 188/73.45; 188/216
[58] Field of Search .............. 188/72.3, 71.8, 73.38, 188/205 A, 196 R, 196 P, 73.44, 73.45, 73.43, 73.36, 73.39, 216

[56] References Cited

U.S. PATENT DOCUMENTS

| | | |
|---|---|---|
| 3,721,322 | 3/1973 | Thompson. |
| 4,629,037 | 12/1986 | Madzgalla et al. ............ 188/72.3 X |
| 4,807,725 | 2/1989 | Weiler et al. ................. 188/71.8 |
| 4,860,858 | 8/1989 | Erben et al. .................. 188/71.8 |
| 4,887,696 | 12/1989 | Redenbarger et al. ......... 188/71.8 X |

FOREIGN PATENT DOCUMENTS

| | | |
|---|---|---|
| 0375956 | 7/1990 | European Pat. Off.. |
| 2703140 | 8/1977 | Fed. Rep. of Germany. |
| 3023103 | 1/1981 | Fed. Rep. of Germany. |
| 3434421 | 4/1985 | Fed. Rep. of Germany. |
| 0074774 | 6/1977 | Japan ......................... 185/73.38 |
| 2036898 | 7/1980 | United Kingdom. |
| 2147069 | 5/1985 | United Kingdom. |
| 2166822 | 5/1986 | United Kingdom. |

Primary Examiner—Douglas C. Butler
Attorney, Agent, or Firm—Robert P. Seitter; J. Gordon Lewis

[57] ABSTRACT

A floating-caliper spot-type disc brake is disclosed having an arrangement for actively retracting the indirectly actuated external brake shoe to create a clearance with the brake disc. Elastic spring elements (24, 34, 38, 45) engage the external brake shoe (10) and the carrier arms (2, 3) of the brake carrier (1) and which are elastically tensioned by actuation of the brake to allow a slight retraction of the external brake shoe when the elements relax as the brake is released. The spring elements are mounted to allow a frictional grip to be overcome to shift the relative relaxed position of the spring element and external brake shoe as the brake lining wears, so that a constant disc clearance is maintained.

4 Claims, 4 Drawing Sheets

FLOATING-CALIPER SPOT-TYPE DISC BRAKE WITH ACTIVELY RESTORED BRAKE SHOES

BACKGROUND OF THE INVENTION

The invention is related to a floating-caliper spot-type disc brake having brake shoes which are actively restored after the operation of the brake, a constant clearance being adjusted independently of the wear of the friction lining.

In a spot-type disc brake of this type shown in German patent specification No. 35 10 372, a floating caliper is axially slidingly guided on a brake carrier by means of pin guides. The floating caliper is furnished with a hydraulic actuator comprising a brake cylinder and a brake piston actuated to cause an axially internal brake shoe to be urged against the brake disc. A reaction force slides the brake caliper to urge an external brake shoe against the brake disc.

The brake shoes are actively restored after the actuation to ensure a constant clearance between the friction areas and the brake disc not withstanding wear of the brake linings. In this context, the directly actuated brake shoe is restored in the known manner by the brake piston which is retracted by a special sealing between the piston wall and the brake cylinder, which then entrains the abutted brake shoe. The whole brake caliper must be slid back in order to restore the brake shoe.

In a disc brake which is known from the German patent specification No. 35 10 372, this takes place due to a special pin guide which is comprised of a ring being frictionally engaged by the pin and of a cup spring engaging the ring and a retaining member on the floating caliper. Upon actuation of the brake, sliding of the floating caliper causes tensioning of the cup spring. After the actuation of the brake, the cup spring pushes the floating caliper back. With advancing wear of the lining, the actuating travel of the brake caliper becomes longer than the clearance to be adjusted so that the cup spring, upon reaching a stop, forces the friction ring to slide a little farther on the pin. In this manner it is insured that the floating caliper is subsequently restored not more than the desired clearance.

This prior-art arrangement disadvantageously is comprised of many components having a complicated shape whose manufacture and mounting incur comparatively high costs. It is a further disadvantage that the pin guides are disposed on the axially internal side and the brake shoe to be cleared is disposed on the axially external side of the floating caliper. In the event of a high force braking, the floating caliper will be elastically stretched so that the actuating travel which occurs at the pin guides will be greater than that at the external brake shoe. This results in a shifting of the friction ring without a corresponding wear of the lining having occurred, with the consequence that in an extreme case no clearance will be adjusted at all and the brake shoe will constantly forced against the brake disc.

It is the object of the invention to provide a spot-type disc brake which is equipped with simple adjustment arrangement for the external brake shoe.

SUMMARY OF THE INVENTION

In the present invention, simple elastic elements are provided in each case, which frictionally engage the external brake shoe or the carrier arms of the brake carrier. These elements create elastic tension upon axial sliding of the floating caliper. The supports are designed such that in the event of an axial movement exceeding the clearance, the elastic element is slid against the frictional engagement either relative to the brake shoe or relative to the carrier arm.

The invention has the advantages that the cost of manufacture is low, that the desired clearance is reliably adjusted even in the case of stretching of the floating caliper, and may be utilized for floating-caliper brakes which are not furnished with a pin guide.

In a first embodiment of the invention, axially slidable U-shaped spring elements frictionally grip the brake carrier arms.

In a preferred further development of the first embodiment, axial grooves are provided in the brake carrier arms, of which one groove positioned externally is formed in casting of the brake carrier, and the other disposed internally, machined into the abutment surfaces of the brake carrier arms. The spring element is simply snapped into the forementioned grooves and is thereby firmly fixed.

A particularly simple and functionally optimal embodiment of the spring element comprises forming an elastic tongue by a slit in one leg of the U-shape, the tongue offset axially and engaging the external brake shoe. The spring element is slid axially as brake wear occurs, the disc clearance always being the width of the slit as the tongue moves to a restored position. Bottoming of the tongue against the adjacent leg causes shifting of the element, overcoming the frictional grip.

In a second embodiment, axially extending recesses are provided in the brake carrier arms, in which an oblong elastic strip is inserted. The strip projects out slightly from the groove to functionally and elastically engage the external brake shoe. A tee shaped groove and elastic strip ensure a firm hold of the elastic strip and a favorable deformation of the portion of the strip forced against the brake shoe.

In further embodiments, leaf-type springs are fixed to the brake shoe and frictionally bear against the brake carrier arm. These embodiments have the additional advantage that a disc brake may be retrofitted with inventive self-restoring brake shoes.

The fixing of the leaf springs to the brake shoe may be by rivets or button head projections engaging holes in one section of the leaf spring.

DETAILED DESCRIPTION

Figure 1:
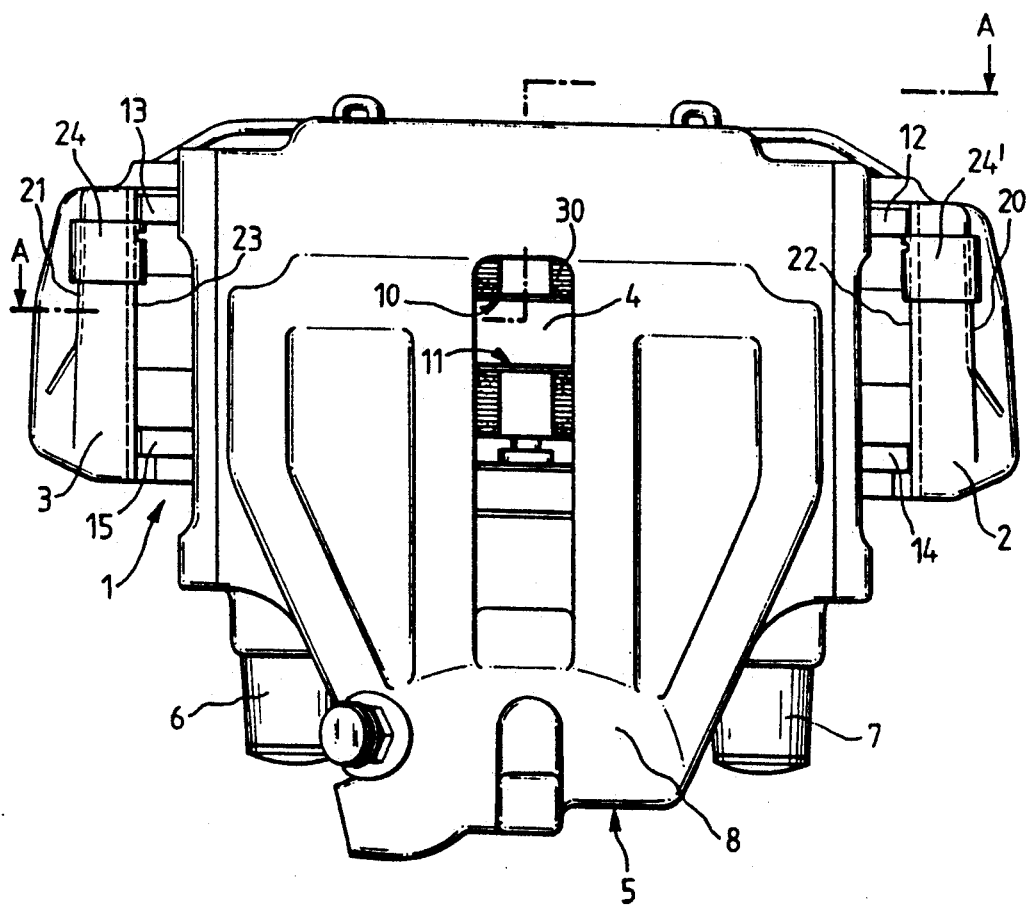
FIG. 1 is a top view of a spot-type disc brake having spring elements fixed to the brake carrier.
Figure 2:
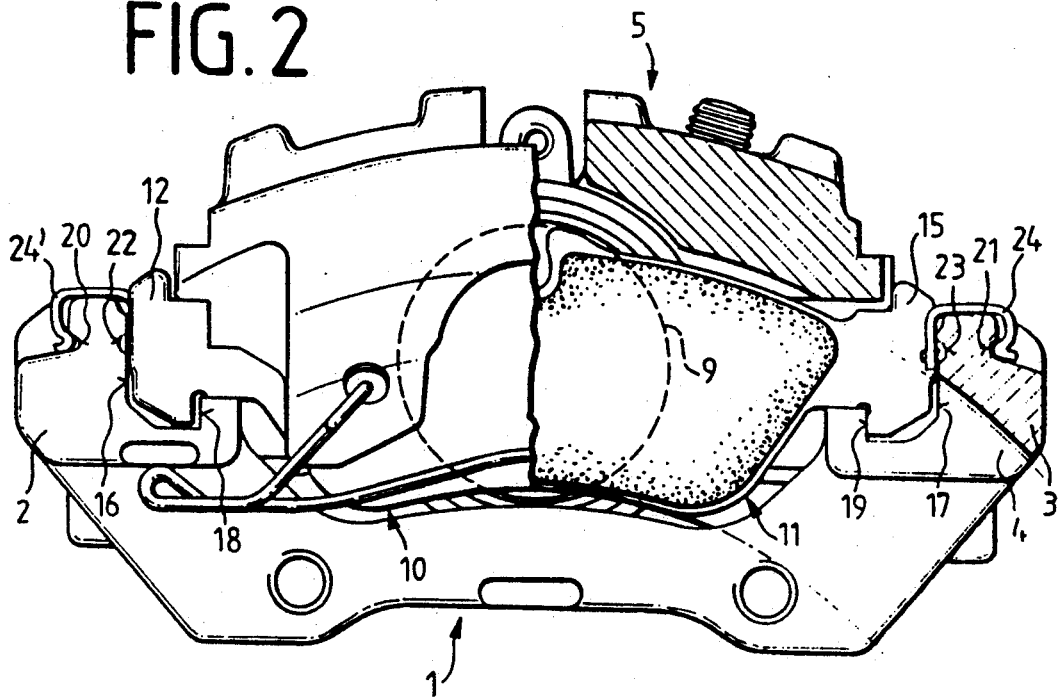
FIG. 2 is a partly cross-sectional view taken along the line 2—2 in FIG. 1.

The spot-type disc brake illustrated in FIGS. 1 and 2 is furnished with a stationary brake carrier 1, comprising carrier arms 2, 3 which extend beyond the outer edge of a brake disc 4 (outlined by a dash-dotted line in FIG. 2). At the brake carrier 1, a floating caliper 5 is axially slidingly supported by means of pin guides 6, 7. On its axially internal side, floating caliper 5 is equipped with a brake cylinder 8, within which is axially slidable a brake piston 9, (outlined by a dashed line in FIG. 2).

On either side of the brake disc 4, brake shoes 10, 11 are axially slidingly guided on the carrier arms 2, 3 insofar as they are supported in the circumferential direction at the guide surfaces 16, 17, 18, 19 of the carrier arms 2, 3 engaging lateral projections 12, 13, 14, 15 on external and internal brake shoes 10, 11.

Upon actuation of the brake, the axially internal brake shoe 11 will be actuated directly by the brake piston 9 and be urged against the brake disc 4. Due to the force of reaction, the floating caliper 5 will slide axially in its pin guides 6, 7, whereby the axially external brake shoe 10 will be actuated indirectly and urged against the brake disc 4.

Figure 3:
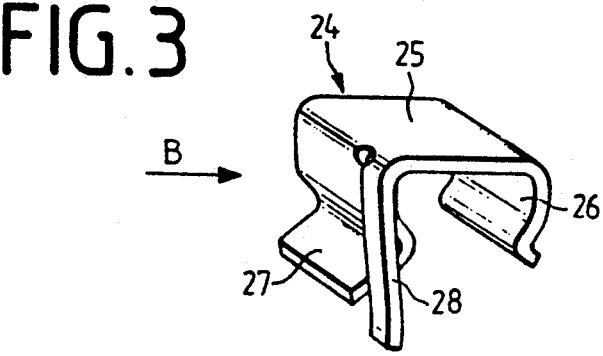
FIG. 3 is a perspective view of the spring element.
Figure 4:
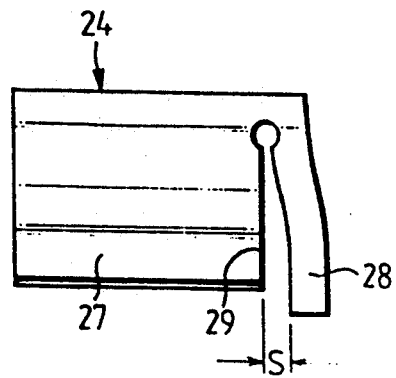
FIG. 4 is a view of the spring element from the direction B in FIG. 3.

In a first embodiment of the invention, the carrier arms 2, are formed with axially extending grooves 20, 21, 22, 23. On each of carrier arms 2, 3, a spring element 24 is disposed so as to be axially slidable upon overcoming the friction of engagement. As will best be appreciated from FIGS. 3 and 4, each spring element 24 is comprised of a sheet or plate metal strip being bent to U-shape having a bridge section 25 and two opposite legs 26, 27. In the assembled condition of the spring element 24, the legs 26, 27 are clamped against the grooves 20, 22 or 21, of the carrier arms 2 or 3.

From one of the legs 27, an elastic tongue 28 is divided which is divided off in an axial direction in correspondence with the clearance "s" created by a slit forming the tongue 28. The projections 12, 13 of the external brake shoe 10 are in abutment against the elastic tongues 28 of the respective spring elements 24.

When the brake shoe 10 is urged against the brake disc 4, the elastic tongues 28 will elastically be deflected towards the leg 27, generating a restoring spring force acting on the external brake shoe 10. After the actuation of the brake the elastic tongues 28 will push the external brake shoe 10 back away from the disc 4 on account of this spring force whereby the clearance s between the friction area of the brake shoe 10 and the brake disc 4 will be automatically set.

The spring force which is brought about in this instance is not sufficient to overcome the functional grip to enable sliding of the spring element 24 on the carrier arm 2, 3. If and when, however, due to an advanced wear of the friction lining 30 of the external brake shoe 10, the actuating travel is larger than the desired clearance s, then the relatively straight elastic tongues 28 are deflected sufficiently to abut against the curved edges 29 of the adjacent leg 27, comprising a stop, and the spring elements 24 are thus slid along the carrier arms 2, 3 as the frictional grip is then overcome. After the braking action is stopped, the brake shoe 10 will be restored to again only create clearance s.

Figure 5:
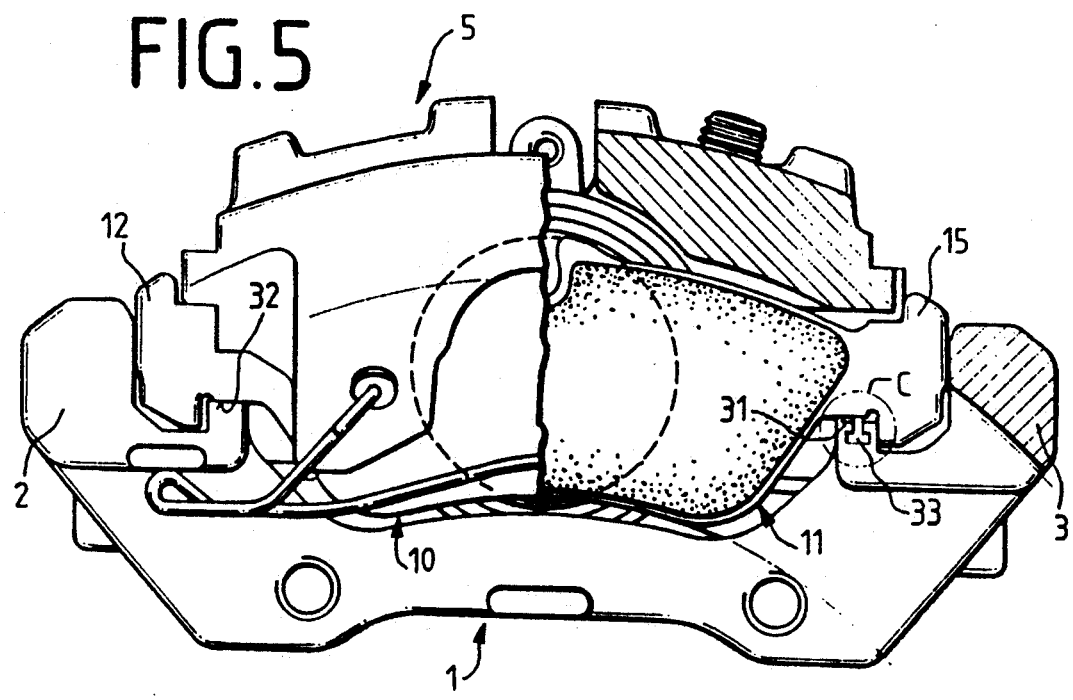
FIG. 5 is a partly cross-sectional side elevational view of a spot-type disc brake with an alternate embodiment having spring members clamped at the brake carrier arms.
Figure 6:
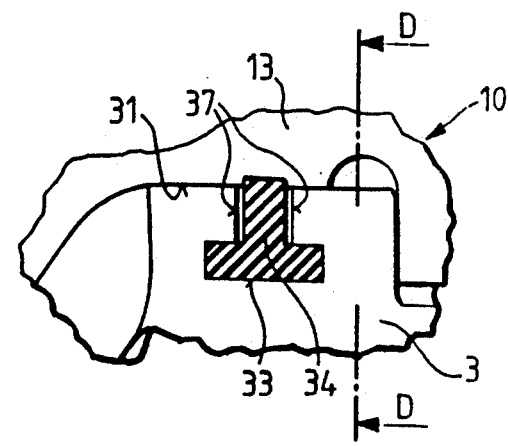
FIG. 6 is an enlarged view of the detail C of FIG. 5.
Figure 7:
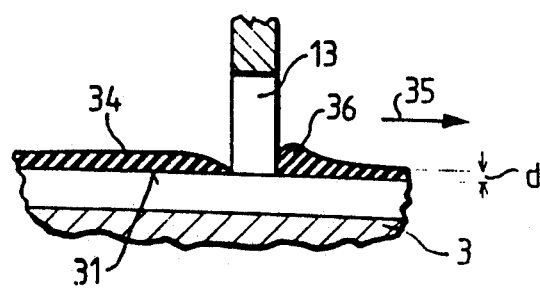
FIG. 7 is a cross section taken along the line 7—7 in FIG. 6.
Figure 8:
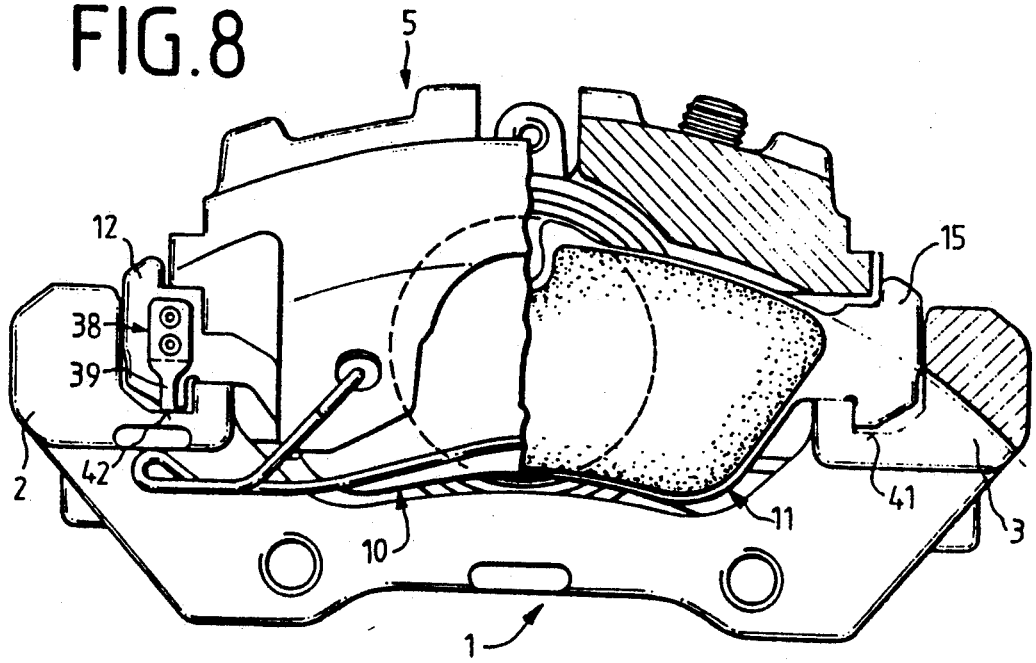
FIG. 8 is a partly cross-sectional side elevational view of a spot-type disc brake with another alternate embodiment having a leaf spring fixed to the brake shoe.

A second embodiment is illustrated in FIGS. 5 to 7. The axially external brake shoe 10 is guided by upper guides on the caliper s acting on the projections 12, 13 in a radial direction to be held against outer radial supporting surfaces 31, 32 of the carrier arms 2, 3. The supporting surfaces 31, 32 are formed with axially extending recesses 33 into each of which a spring element constituted by an elongated elastic strip 34 of a suitable material such as a heat-resistant rubber is pressed in. The elastic strip 34 projects slight a distance d out of the recess 33 beyond the supporting surface 31, 32 and thus is compressed the distance d due to engagement with the brake shoe projections 12, 13.

Upon actuation of the brake, the external brake shoe 10 will move in the direction of the arrow 35 (FIG. 7). On account of the static friction between the projections 12, 13 and the elastic strip 34, the elastic strip 34 will be elastically deformed and a bulge 36 will be formed. If and when the actuating travel in the direction of the arrow 35 is larger than the admissible clearance, then the static friction will be overcome and the projections 12, 13 will slide along the spring member 34. After the braking action the elastic strip 34 will relax and consequently push the brake shoe 10 back the distance of the clearance, in the direction opposite to that indicated by the arrow 35.

T-shaped sections are preferred in order to ensure a firm hold of the spring member 34 within the recess 33. Slight spaces are provided between the walls 37 of the recess 33 and the elastic strip 34 in order to render possible an expansion of the elastic strip 34 in undergoing elastic deformation.

A third embodiment is illustrated in FIGS. 8 to 11. A U-shaped leaf spring 38 is riveted to each of the external brake shoe projections 12, 13. The leaf springs 38 are formed with spring arms 39 which are normally inclined towards the fixed leg to cause the free ends 40 to be abutted with a prestress in the radial direction against radial surfaces 41, 42 of the carrier arms 2, 3.

Figure 10:
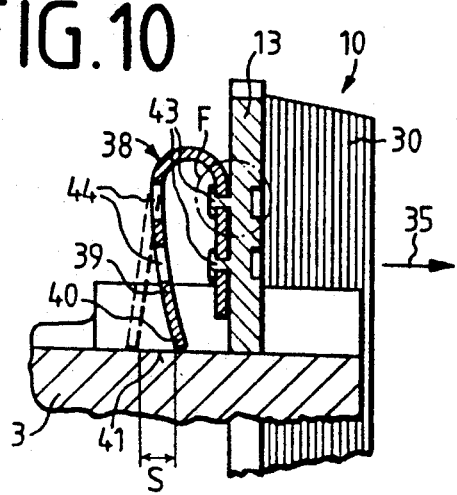
FIG. 10 is a cross section along the line 10—10 in FIG. 9.
Figure 9:
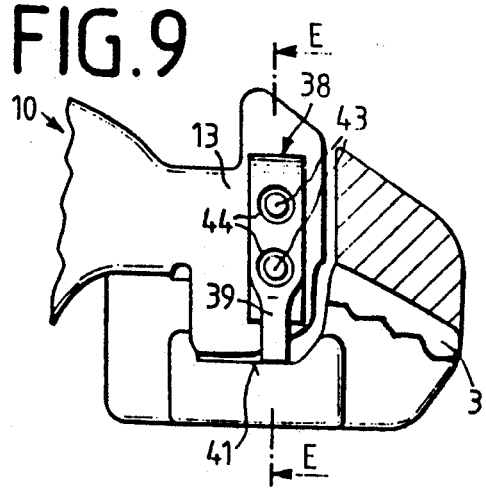
FIG. 9 is an enlarged partial view of a projection of the brake shoe with a U-shaped leaf spring.

In the event of an axial movement of the brake shoe 10 in the direction of the arrow 35, the spring arms 39 will be bent outwardly in the axial direction (shown by dashed lines in FIG. 10). If and when the actuating travel exceeds the clearance s, the leg 39 is bent to be inclined away from the fixed leg, causing diminished radial frictional prestress so that the frictional lock between the free end 40 and the surface 41, 42 is greatly diminished, and the free end 40 will slide along the surface 41, 42. After the braking action, the relaxing leaf spring 38 will again spring back the leg 39 to retract the brake shoe 10 a distance equal to the clearance s.

Two button head through extensions are provided at each of the brake shoe projections 12, 13 for the fixing of the leaf spring 38. The spring arm 39 is furnished with holes 44 which are intended for the passage of a riveting tool (not shown).

Figure 12:
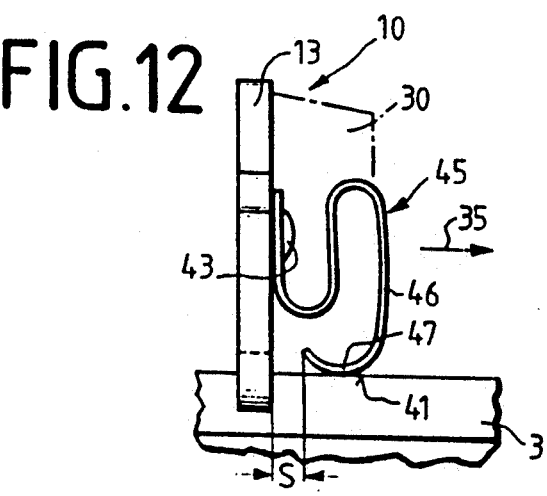
FIG. 12 is a front elevational view of a brake shoe with an S-shaped leaf spring.
Figure 11:
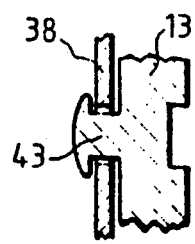
FIG. 11 is a detail F of FIG. 10.

FIG. 12 shows a fourth embodiment. In this instance, S-shaped leaf springs 45 are envisaged whose spring arms 46 have reversely curved end sections 47, engaging with a frictional prestress in the radial direction against the radial surfaces 41, 42 on the axial side of the projections 12, 13 facing the brake disc 4. The end sections 47 are arranged at a slight axial distance s from projections 12,13.

A movement of the brake shoe 10 in the direction of the arrow 35 will initially lead to a bending of the spring arms 46 towards the brake shoe projection 12, 13 by the amount s until the end sections 47 come into abutment against the projections 12, 13. In the event of a further movement in the direction of the arrow 35 the end sections 47 will be slid on the surface 41 overcoming the frictional force. Upon relaxation of the spring arms 46, the brake shoes 10, 11 will be retracted the distance s.

We claim:

1. A floating-caliper spot-type disc brake including:
   a brake disc;
   a stationary brake carrier comprising two carrier arms which extend beyond the outer edge of said brake disc substantially in an axial direction;
   a floating caliper which straddles the outer edge of said brake disc and is axially slidingly supported on said brake carrier, said floating caliper having an external and an internal side;
   a hydraulic actuator mounted in said floating caliper internal side, said actuator comprising a brake cylinder and a brake piston axially slidable within said brake cylinder;
   an internal and an external brake shoe respectively disposed on either side of said brake disc, said brake shoes each having a projection at either end engaging said carrier arms of said brake carrier so as to be axially slidably guided thereon;
   said internal and external brake shoes straddles by said floating caliper so that upon actuation of said disc brake by pressurization of said cylinder, said internal brake shoe is urged against said brake disc directly by said piston and said external brake shoe is urged against said brake disc indirectly by said external side of said floating caliper which slides in an axial direction, circumferential forces occurring during braking action transmitted by said brake shoes to said carrier arms;
   a pair of spring elements, each axially slidingly mounted on a respective carrier arm, each of said spring elements frictionally gripping said respective carrier arm, each, spring element having an elastically movable tongue projection to be engaged by said external brake shoe upon actuation of said disc brake, said tongue elastically deflected by movement of said external brake shoe caused by axial movement of said floating caliper in the direction of said brake disc to generate a spring force acting on said external brake shoe, said spring force not being sufficient overcome said friction to slide the said spring element on said carrier arm;
   said spring element having a stop engaged by said elastic tongue upon deflection thereof to a predetermined extent, to allow said external brake shoe to exert a force sufficient to overcome said frictional grip and to slide said spring element on said carrier arm.

2. A spot-type disc brake as claimed in claim 1, wherein two spring elements are provided, wherein said carrier arms are each formed with axially extending grooves on opposite sides thereof, said two spring elements each U-shaped with a bridge section and a pair of opposite legs, each of said leg pairs clamping onto said grooves on a respective carrier arm.

3. A spot-type disc brake as claimed in claim 2, wherein said elastic tongue is divided from one of said pair of legs of each of said spring elements by a slit which runs from a free end of said leg towards said bridge section, and in that said elastic tongue is thereby spaced from said leg in an axial direction, to create a clearance.

4. A spot-type disc brake comprising:
   a brake disc rotatable about an axis;
   a stationary brake carrier having two spaced apart parallel arms;
   a floating caliper straddling an outer edge of said brake disc having an internal side and an external side disposed on opposite sides of said brake disc;
   caliper support means guidingly supporting said floating caliper on said brake carrier for movement along the direction of said brake disc axis;
   a hydraulic actuator carried by said internal said of said floating caliper including a cylinder and a piston slidable in said cylinder;
   an internal brake shoe located adjacent said internal side of said floating caliper on one side of said brake disc and an external brake shoe located adjacent said external side of said floating caliper on the other side of said brake disc, said internal brake shoe engaged by said piston upon actuation of said brake to be forced against said one side of said brake disc, said external brake shoe engaged by said external side of said floating caliper to be forced against the other side of said brake disc;
   said internal and external brake shoes each having projections at either end engaging a respective brake carrier arm to be guided thereon during said actuation thereof;
   the improvement comprising retraction spring means acting between each projection of said external brake shoe and a respective carrier arm creating limited elastic deflection thereof by relative movement of said associated projection during brake actuation, said limited elastic deflection creating a predetermined clearance between said external brake shoe and said brake disc upon relaxation of said retraction spring means after brake actuation; said retraction spring means including a pair of U-shaped spring elements, each frictionally gripping a respective carrier arm and an elastic tongue on each spring element spaced from the remaining portions of said respective spring element in the direction of brake shoe travel, each of said tongues engaged by a respective external brake shoe projection to be elastically deflected by travel of said external brake shoe during brake actuation to abut remaining portions of said spring elements after travel thereof corresponding to said predetermined clearance, said spring elements shifted on said respective carrier arm by overcoming said frictional gripping after said tongues are elastically deflected to abut the remaining portions of said spring elements; means causing shifting of each of said spring element's position relative said associated one of said carrier arms in the relaxed state thereof upon travel of said external brake shoe in excess of said clearance space, whereby shifting of said spring elements on said carrier arms takes up brake shoe wear and maintains a substantially constant clearance space.

* * * * *